United States Patent [19]

Inoue

[11] Patent Number: 4,598,985

[45] Date of Patent: Jul. 8, 1986

[54] EXPOSURE CONTROL DEVICE FOR CAMERA

[75] Inventor: Akira Inoue, Hachioji, Japan

[73] Assignee: Olympus Optical Co., Ltd., Tokyo, Japan

[21] Appl. No.: 672,991

[22] Filed: Nov. 19, 1984

[30] Foreign Application Priority Data

Apr. 2, 1984 [JP] Japan .................................. 59-66059

[51] Int. Cl.⁴ .............................................. G03B 7/00
[52] U.S. Cl. ...................................................... 354/21
[58] Field of Search ......................................... 354/21

[56] References Cited

U.S. PATENT DOCUMENTS

| 4,200,371 | 4/1980 | Suzuki et al. | 354/21 |
| 4,431,283 | 2/1984 | Hoda et al. | 354/21 |
| 4,512,643 | 4/1985 | Tokuda | 354/21 |

FOREIGN PATENT DOCUMENTS

| 0051736 | 5/1978 | Japan | 354/21 |
| 0205718 | 12/1982 | Japan | 354/21 |

*Primary Examiner*—Russell E. Adams
*Attorney, Agent, or Firm*—Louis Weinstein

[57] ABSTRACT

An exposure control device for a camera is disclosed which is adapted to read film speed information indicated on a film cartridge in the form of a binary code comprising at least three digits. The device comprises at least three read contacts which are adapted to read each digit of the binary code, and at least three resistors each connected to one of the respective read contacts. A voltage divider is formed by a separate resistor and one or more of the resistors connected to the read contacts, and the junction therebetween is connected to one input of a comparator which is used in the decision of an exposure level. A photometric circuit including a light receiving element having a photoelectric conversion coefficient $\gamma_c$ has its output connected to the other input of the comparator. The value of the photoelectric conversion coefficient $\gamma_c$ is chosen so that a reference voltage which is developed at said one input in response to each of at least four values of film speed be kept within a permissible range of exposure errors.

19 Claims, 9 Drawing Figures

FIG. 2

| FILM SPEED (ISO) | BINARY CODE | | | | | |
|---|---|---|---|---|---|---|
| | A | B | C | D | E | F (COMMON) |
| 25 | 0 | 0 | 0 | 1 | 0 | 1 |
| 32 | 0 | 0 | 0 | 0 | 1 | 1 |
| 40 | 0 | 0 | 0 | 1 | 1 | 1 |
| 50 | 1 | 0 | 0 | 1 | 0 | 1 |
| 64 | 1 | 0 | 0 | 0 | 1 | 1 |
| 80 | 1 | 0 | 0 | 1 | 1 | 1 |
| 100 | 0 | 1 | 0 | 1 | 0 | 1 |
| 125 | 0 | 1 | 0 | 0 | 1 | 1 |
| 160 | 0 | 1 | 0 | 1 | 1 | 1 |
| 200 | 1 | 1 | 0 | 1 | 0 | 1 |
| 250 | 1 | 1 | 0 | 0 | 1 | 1 |
| 320 | 1 | 1 | 0 | 1 | 1 | 1 |
| 400 | 0 | 0 | 1 | 1 | 0 | 1 |
| 500 | 0 | 0 | 1 | 0 | 1 | 1 |
| 640 | 0 | 0 | 1 | 1 | 1 | 1 |
| 800 | 1 | 0 | 1 | 1 | 0 | 1 |
| 1000 | 1 | 0 | 1 | 0 | 1 | 1 |
| 1250 | 1 | 0 | 1 | 1 | 1 | 1 |
| 1600 | 0 | 1 | 1 | 1 | 0 | 1 |
| 2000 | 0 | 1 | 1 | 0 | 1 | 1 |
| 2500 | 0 | 1 | 1 | 1 | 1 | 1 |
| 3200 | 1 | 1 | 1 | 1 | 0 | 1 |
| 4000 | 1 | 1 | 1 | 0 | 1 | 1 |
| 5000 | 1 | 1 | 1 | 1 | 1 | 1 |

EXPOSURE CONTROL DEVICE FOR CAMERA

BACKGROUND OF THE INVENTION

The invention relates to an exposure control device for a camera, and more particularly, to such device for automatically reading or sensing information in the form of a binary code defined on the surface of a film cartridge and representing film speed as such cartridge is loaded into a camera, thereby allowing a voltage corresponding to a particular value of film speed to be established for use in the decision of an exposure level.

An exposure control device which is capable of automatically reading information in the form of a binary code which may be defined by a conductive member printed on the surface of a film cartridge as such cartridge is loaded into a camera is already well known, as disclosed in Japanese Laid-Open Patent Application No. 51,736/1978, for example. However, a conventional exposure control device of this kind utilizes a complex electrical circuit, which resulted in an increased cost of a resulting camera.

For a discussion of this aspect, a reference is made to the drawings. FIG. 1 is a circuit diagram of one form of exposure control device for a camera which is proposed in the prior art. In the exposure control device shown in FIG. 1, a terminal 1 is connected to a source of supply voltage $+V_{cc}$, and a light receiving element 2 and an integrating capacitor 3 are connected in series across the terminal 1 and the ground, with the junction between the element 2 and the capacitor 3 being connected to the ground through a switch 4 which remains closed, as shown, during the time a shutter remains closed. This junction is also connected to the non-inverting input terminal of a comparator 5 which is used as decision means to determine a proper amount of exposure. The comparator 5 also has an inverting input terminal which is connected to the junction between a pair of resistors 8, 9 connected in series across the terminal 1 and the ground and forming a voltage divider. The output terminal of the comparator 5 is connected to the terminal 1 through an electromagnet 6 which is effective to control the operation of a shutter. The element 2 may comprise a photoelectric transducer element such as may be formed by CdS (cadmium sulfide) element, for example, which exhibits a varying resistance with the brightness of an object being photographed.

The described device operates as follows: Initially, when a shutter is opened in response to a shutter release operation, the switch 4 is opened. Accordingly, a photocurrent flowing through the element 2 passes through the integrating capacitor 3 to charge it. Before the voltage Vc1 across the capacitor reaches a decision voltage $V_E$ which is determined by the voltage divider resistors 8, 9, the comparator 5 produces an output of a low level (which is hereafter referred to as "L" level) to maintain the electromagnet 6 energized, thus preventing the shutter from being closed. However, when the charged voltage Vc1 reaches the level of the decision voltage $V_E$, the output from the comparator 5 changes to a high level (hereafter referred to as "H" level), thus deenergizing the electromagnet 6 to allow the shutter to be closed.

When the resistance of the element 2 is represented by $R_{CdS}$, the resistance of the element 2 at a particular value of brightness by $R_{CdS0}$, an incremental change from a reference brightness by $\Delta EV$ and the photoelectric conversion coefficient of the element 2 by $\gamma_c$, these parameters are related as indicated by the following equality:

$$R_{CdS} = R_{CdS0} 2^{-\gamma_c \Delta EV} \quad (1)$$

It will be apparent from the equation (1) that a change in the increment $\Delta EV$ causes a change in the resistance $R_{CdS}$.

In the arrangement of FIG. 1, the voltage Vc1 across the capacitor 3 can be expressed in terms of the capacitance $C_1$ of the capacitor 3 and the photocurrent $i_{CdS}$ of the element 2, as follows:

$$Vc1 = \frac{1}{C_1} \int i_{CdS} dt \quad (2)$$

Thus, the exposure time t when the equality $Vc1 = V_E$ applies is determined as follows:

$$t = C_1 \times \frac{V_E}{i_{CdS}} \quad (3)$$

$$= C_1 \times \frac{V_E}{V_{cc}} \cdot R_{CdS}$$

The substitution of the equation (1) into the equation (3) yields:

$$t = C_1 \times \frac{V_E}{V_{cc}} \times R_{CdS0} 2^{-\gamma_c \Delta EV} \quad (4)$$

When films which exhibit different values of film speed are used, it is necessary that the level of the decision voltage which is used for the equality $Vc1 = V_E$ must vary depending on such value of film speed. This may be achieved by changing the magnitude of the voltage Vc1 by employing a variable optical stop 7 disposed in front of the element 2 to change the amount of light received or by changing the level of the decision voltage $V_E$ by employing a variable ratio of division by the resistors 8, 9.

Considering a situation that the level of the decision voltage $V_E$ is changed by using a variable ratio formed by the resistors 8, 9 in accordance with a particular value of film speed, the decision voltage $V_E$ can be expressed as follows:

$$V_E = \frac{R_2}{R_1 + R_2} \cdot V_{cc} \quad (5)$$

where $R_1$ and $R_2$ represent the resistance of the resistors 8, 9, respectively. Assuming that the resistances $R_1$ and $R_2$ are related such that $R_1 >> R_2$, we have $$V_E \approx \frac{R_2}{R_1} \cdot V_{cc} \quad (6)$$

Accordingly, by changing the resistance $R_2$ of the resistor 9, the decision voltage $V_E$ changes, thereby varying the exposure period t indicated by the equation (4). In order to accommodate for any selected value of film speed through a change in the resistance $R_2$ of the resistor 9 rather than by the optical stop 7 disposed in front of the light receiving element 2, the resistance $R_2$ must satisfy the following equation:

$$R_2 = R_{02} 2^{-\gamma_c \Delta SV} \quad (7)$$

where $R_{02}$ represents a resistance of the resistor 9 for a standard film speed and can be suitably chosen in the design of the electrical circuit of the exposure control device, and $\Delta SV$ a change from the standard film speed. It will be seen that the equation (7) is similar in form to the equation (1). Thus, by changing the resistance $R_2$ of the resistor 9 as an exponential function of the photoelectric conversion coefficient $\gamma_c$ of the light receiving element 2, the decision voltage $V_E$ varies in accordance with the film speed, thus allowing an accommodation for any value of film speed.

FIG. 2 is a table of binary codes representing various values of film speed which are indicated in known form on a film cartridge. The binary code includes six bits, namely, bit A to bit F. Bits A to E are formed by a conductive area representing "1" or a non-conductive area representing "0" while the bit F comprises a common conductive area. In effect, film speed information is indicated by the five most significant bits A to E of the binary code, and only those bits which represent "1"'s are connected to the common bit F. Accordingly, when a film cartridge carrying a binary code which represents a film speed is loaded into a camera, contacts $S_A$ to $S_E$, which are disposed for reading the respective bits A to E in the binary code are turned on for a "1" bit and turned off for a "0" bit. By way of example, it will be seen from FIG. 2 that for a film speed of ISO 100, the read contacts $S_A$ to $S_E$ are operated such that $S_A$ is off, $S_B$ is on, $S_C$ is off, $S_D$ is on and $S_E$ is off.

Reference to FIG. 2 will indicate that the three most significant bits A, B and C of the binary code define a binary counter which is incremented by one for each 1 EV change in the film speed such as for ISO 25, 50, 100, . . . 1600, 3200, . . . Film speeds which are most frequently used are in a range from ISO 50 to 800. By choosing the resistance $R_2$ of the resistor 9 for ISO 50 as a reference resistance $R_{02}$, for example, the resistances for other values of film speed will be related as follows:

$$\left.\begin{array}{l}\text{ISO 50; } R_2 = R_{02} \\ \text{ISO 100; } R_2 = R_{02}\, 2^{-\gamma_c} = \alpha\, R_{02} \\ \text{ISO 200; } R_2 = R_{02}\, 2^{-2\gamma_c} = \alpha^2\, R_{02} \\ \text{ISO 400; } R_2 = R_{02}\, 2^{-3\gamma_c} = \alpha^3\, R_{02} \\ \text{ISO 800; } R_2 = R_{02}\, 2^{-4\gamma_c} = \alpha^4\, R_{02}\end{array}\right\} \quad (8)$$

where $\alpha = 2^{-\gamma_c}$

In other words, for those values of film speed in a range from ISO 50 to 800 which vary incrementally by 1 EV, a decision voltage $V_E$ corresponding to a particular value of the film speed will be obtained by choosing the resistance $R_2$ of the resistor 9 shown in FIG. 1 in accordance with the equations (8). Accordingly, by providing a plurality of resistors having different resistances as indicated by the equations (8) in accordance with various ISO values of the film speed, and selecting one of these resistors for connection between the resistor 8 and the ground, a proper value of the decision voltage $V_E$ can be established. Such selection means may comprise a decoder as shown in FIG. 3, for example.

The decoder shown in FIG. 3 includes a terminal 11 to which the "1" or "0" signal of the bit A in the binary code is applied, a second terminal 12 to which the signal for the bit B is applied, and a third terminal 13 to which the signal for the bit C is applied. As shown, the terminal 11 is directly connected to each first input of AND gates 18, 20, 22, and is also connected through an inverter 14 to each first input of AND gates 17, 19, 21. The terminal 12 is directly connected to each second input of AND gates 19, 20 and is also connected through an inverter 15 to each second input of AND gates 17, 18, 21, 22. The terminal 13 is directly connected to each third input of AND gates 21, 22, and is also connected through an inverter 16 to each third input of AND gates 17 to 20.

When "1" or "0" signals of the bits A to C are applied to the terminals 11 to 13, one of the AND gates 17 to 22 develops an output of "H" level in accordance with the binary code, thus allowing one of the resistances indicated by the equations (8) to be selected.

FIG. 4 shows the electrical circuit of another exposure control device available in the prior art. The electrical circuit shown in FIG. 4 includes an electrical circuit portion comprising the light receiving element 2, integrating capacitor 3, comparator 5, electromagnet 6 and resistor 8 which are connected in the same manner as illustrated in FIG. 1. However, the resistor 9 is replaced by an automatic film speed presetting circuit including NPN transistors 31 to 47, PNP transistors 48 to 53, resistors 55 to 73 and read contacts $S_A$ to $S_E$, all of which are connected between the non-inverting input of the comparator 5 and the ground, and a manual film speed presetting circuit including resistors 74 to 79 and a changeover switch 80.

When a film cartridge carrying a binary code which represents a film speed is loaded into a camera, it is assured that the read contact $S_D$ associated with the bit D or the read contact $S_E$ associated with the bit E will be turned on, as will be evident from FIG. 2. Accordingly, the transistors 48 and 32 are turned on, whereby the transistor 31 is turned off. This prevents the changeover switch 80 which is disposed to select one of the manual presetting resistors 74 to 79 from being connected to the ground, thus disabling the manual presetting circuit. The read contacts $S_A$, $S_B$ and $S_C$ will be turned on or off in accordance with the bits A, B and C, whereby one of the transistors 33, 34, 37, 39, 43 and 45 will be turned on to connect one of the resistors 59, 62, 67, 68, 72 and 73 across the non-inverting input of the comparator 5 and the ground. It will be understood that these resistors 59 to 73 represent film speed values of ISO 25, 50, 100, 200, 400 and 800, and have resistances which are chosen in accordance with the equations (8). By way of example, if a film cartridge carries a binary code of "00010" representing ISO 25, only the read contact $S_D$ will be turned on. Where the read contacts $S_A$, $S_B$ and $S_C$ associated with more significant bits are off, the transistor 33 is turned on to connect the resistor 59. By way of another example, if a film cartridge carries a binary code of "10010" representing ISO 50, the read contacts $S_A$ and $S_D$ will be turned on. When the contact $S_A$ is turned on, the transistor 49 is turned on, whereby the transistors 34 and 35 will be turned on while the transistor 33 will be turned off, thus connecting the resistor 62. By way of a further example, if the binary code is "11010" representing ISO 200, the read contacts $S_A$, $S_B$ and $S_D$ will be turned on. When both the contacts $S_A$ and $S_B$ are on, the transistors 50 and 51 are turned on, whereby the transistor 36 is turned on, the transistors 37, 38 will be turned off, and the transistors 39 to 41 will be turned on. Accordingly, the base-emitter path of the transistor 33 as well as the base-emitter path of the transistor 34 will be short-circuited, turning the transistors 33, 34 off. Hence, only the resistor 68 will be connected in this instance. In a similar manner, the resistor 72 will be connected for ISO 400 and the resistor 73 will be connected for ISO 800. Finally, the resistor 67 will be connected for ISO 100.

When a film cartridge carrying no binary code is loaded into a camera, all of the read contacts $S_A$ to $S_D$ remain off, and hence the transistors 48, 32 are off to allow the transistor 31 to be turned on, whereby one of the manual presetting resistors 74 to 79 will be selected by the changeover switch 80 to be connected to the ground. The resistors 74 to 79 correspond to ISO 25 to 800, respectively, and have resistances as indicated by the equations (8). In this manner, a film speed from ISO 25 to 800 can be manually selected.

It will be understood from the above description that the device shown in FIG. 4 allows a decision voltage to be established by reading a binary code indicated on the surface of a film cartridge. However, the circuit diagram of FIG. 4 indicates that the device utilizes an increased number of electronic parts such as transistors, disadvantageously requiring a very complex circuit arrangement.

SUMMARY OF THE INVENTION

In view of the foregoing, it is an object of the invention to provide an exposure control device for camera which uses a simple circuit arrangement.

In accordance with the invention, a plurality of automatic film speed presetting resistors are provided and connected to corresponding read contacts. These resistors have resistances which are chosen to be in a given ratio with respect to a particular resistance which is associated with a typical value of film speed. By using a photometric circuit having a photoelectric conversion coefficient which is suitably chosen, a greatly simplified arrangement may be used to read a binary code indicated on the surface of a film cartridge to represent different values of film speed which vary by at least 1 EV interval in order to establish a reference or decision voltage automatically with a reduced exposure error for use in the decision of an exposure level. This arrangement can be advantageously utilized in a compact camera, in particular.

BRIEF DESCRIPTION OF THE DRAWINGS

FIG. 2 is a table indicating various binary codes indicated on a film cartridge to represent various values of film speed;

DETAILED DESCRIPTION OF PREFERRED EMBODIMENTS

Figure 1:
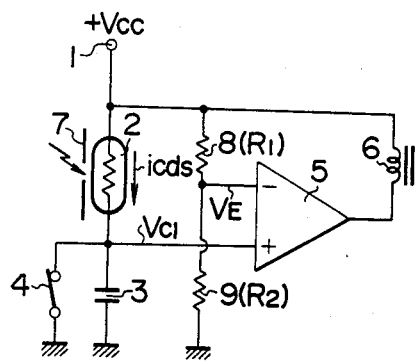
FIG. 1 is a circuit diagram of one form of conventional exposure control device.
Figure 3:
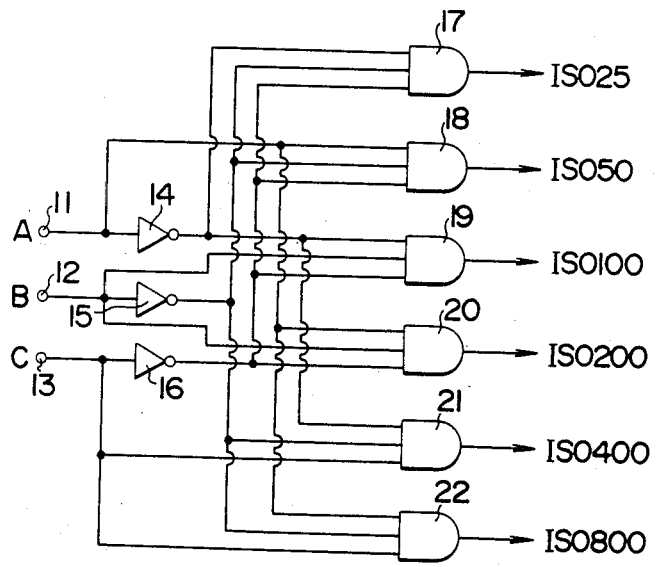
FIG. 3 is a circuit diagram of one form of decoder which may be used to read the binary code.
Figure 4:
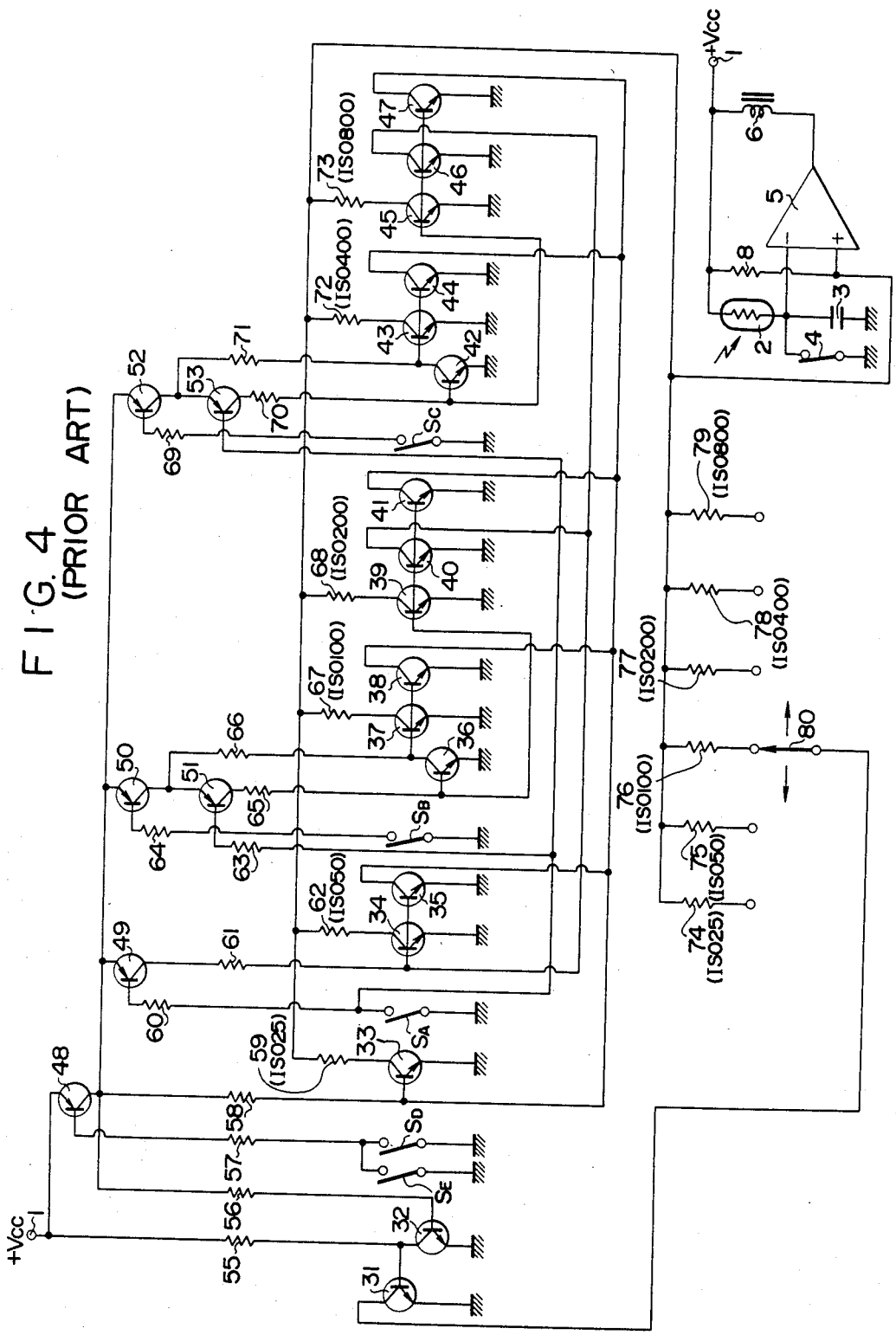
FIG. 4 is a circuit diagram of another electrical circuit of a conventional exposure control device.
Figure 5:
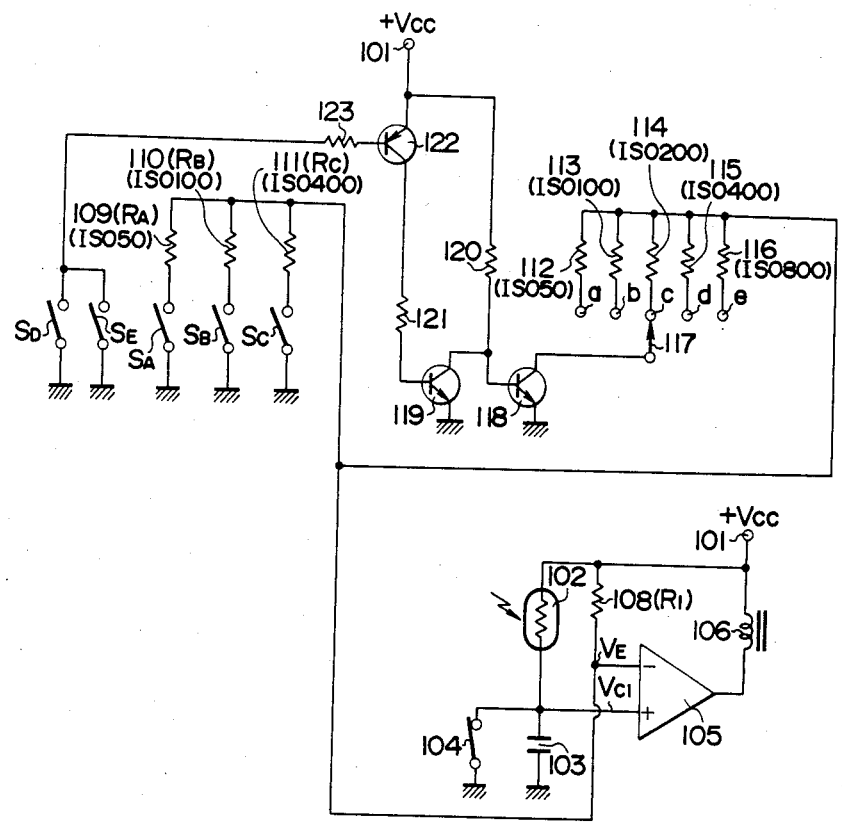
FIG. 5 is a circuit diagram of an exposure control device according to one embodiment of the invention.

FIG. 5 is a circuit diagram of an exposure control device for camera which is constructed in accordance with one embodiment of the invention. As shown, the device includes a terminal 101 to which a supply voltage $+V_{cc}$ is applied. A series combination of a light receiving element 102 and an integrating capacitor 103 is connected between the terminal 101 and the ground, and the junction therebetween is connected to the ground through a switch 104 which remains closed as long as a shutter remains closed. The junction is also connected to the non-inverting input of a comparator 105 which is used to determine an exposure level. The comparator 105 has its inverting input connected to the terminal 101 through a voltage divider resistor 108 and its output terminal connected to the terminal 101 through an electromagnet 106 which controls the operation of a shutter.

It will be noted that the inverting input of the comparator 105 is connected to one end of each of automatic presetting resistors 109 to 111, the other end of which is connected to the ground through read contacts $S_A$, $S_B$ and $S_C$, respectively. The inverting input of the comparator 105 is also connected to one end of each of a plurality of manual presetting resistors 112 to 116, the other end of which is connected to fixed contacts a to e, respectively, of a changeover switch 117. The changeover switch 117 has a movable contact which is connected to the collector of an NPN transistor 118. The base of the transistor 118 is connected to the collector of an NPN transistor 119 and is also connected to the terminal 101 through a resistor 120. The transistors 118 and 119 have their emitters connected to the ground, and the base of the transistor 119 is connected through a resistor 121 to the collector of a PNP transistor 122. The transistor 122 has its emitter connected to the terminal 101 and its base connected through a resistor 123 to one terminal of each of read contacts $S_D$ and $S_E$ which are connected in parallel and have their other end connected to the ground.

Among the resistors described above, the manual presetting resistors 112 to 116 correspond to ISO 50, 100, 200, 400 and 800, and have resistances which are chosen in accordance with the equations (8). The automatic presetting resistors 109 to 111 correspond to ISO 50, 100 and 400, and have resistances $R_A$ to $R_C$ which are chosen such that $R_A = R_{02}$, $R_B = \alpha R_{02}$ and $R_C = \alpha^3 R_{02}$. As mentioned previously, $R_{02}$ represents a resistance corresponding to a standard film speed and $\alpha$ is represented as $\alpha = 2^{-\gamma_c}$ where $\gamma_c$ represents the photoelectric conversion coefficient of the element 102.

In operation, when a film cartridge carrying no binary code is loaded into a camera, all of the read contacts $S_A$ to $S_E$ remain off. Accordingly, the transistors 122, 119 remain off while the transistor 118 is turned on. Thus, the movable contact of the changeover switch 117 is connected to the ground, allowing one of the manual presetting resistors 112 to 116 which is selected by the switch 117 to be connected between the inverting input of the comparator 105 and the ground. Thus, a decision voltage $V_E$ which is obtained by the substitution of one of the equations (8) into the equation (6) is applied to the inverting input of the comparator 105. Subsequently when the switch 104 opens in response to a shutter release operation, the photocurrent from the element 102 begins to charge the integrating capacitor 103 until the voltage Vc1 becomes equal to $V_E$, whereupon the comparator 105 produces an output of "H" level, deenergizing the electromagnet 106 to allow the shutter to be closed.

When a film cartridge carrying a binary code is loaded into a camera, the read contacts $S_A$ to $S_E$ are selectively turned on or off in accordance with the binary code. Since it is assured that either one of the read contacts $S_D$ and $S_E$ which are associated with the two least significant digits of the binary code is turned on, the transistor 122 is turned on, whereby the transistor 119 is turned on. This turns the transistor 118 off, disconnecting the movable contact of the changeover switch 117 from the ground to disable the manual presetting circuit.

Considering the read contacts $S_A$ to $S_C$ associated with the three most significant digits of the binary code, it will be seen from an inspection of FIG. 2 that the contact $S_A$ is on for ISO 50, the contact $S_B$ is on for ISO 100, the contacts $S_A$ and $S_B$ are on for ISO 200, the contact $S_C$ is on for ISO 400 and the contacts $S_A$ and $S_C$ are on for ISO 800. Accordingly, when the film speed changes at an interval of 1 EV in a range from ISO 50 to 800, the resistance $R_2$ between the inverting input of the comparator 105 and the ground changes as follows:

$$\left.\begin{array}{l} \text{ISO 50; } R_2 = R_A = R_{02} \\ \text{ISO 100; } R_2 = R_B = \alpha R_{02} \\ \text{ISO 200; } R_2 = \frac{R_A \cdot R_B}{R_A + R_B} = \frac{\alpha}{\alpha + 1} R_{02} \\ \text{ISO 400; } R_2 = R_C = \alpha^3 R_{02} \\ \text{ISO 800; } R_2 = \frac{R_A \cdot R_C}{R_A + R_C} = \frac{\alpha^3}{\alpha^3 + 1} R_{02} \end{array}\right\} \quad (9)$$

A comparison of the equations (9) with the equations (8) indicates that a coincidence is established therebetween for film speed values ISO 50, 100 and 400, meaning that the resulting decision voltage $V_E$ applied to the inverting input of the comparator 105 is theoretically correct. However, for ISO 200 and 800, the resistances indicated by the equations (9) show a composite resistance which is different from that indicated by the equations (8), and hence the resulting decision voltage $V_E$ will be different from a theoretical value corresponding to the film speed.

Representing the theoretical value of the resistance by $R_T$, the actual resistance by $R_E$ and the resulting deviation $\Delta EV$, we have $$R_E = R_T 2^{\gamma_c \Delta EV} \quad (10)$$

For ISO 200, we have $$\left.\begin{array}{l} R_T = \alpha^2 R_{02} \\ R_E = \frac{\alpha}{\alpha + 1} R_{02} \end{array}\right\} \quad (11)$$

The substitution of the equations (11) into the equation (10) yields:

$$\frac{\alpha}{\alpha + 1} R_{02} = \alpha^2 R_{02} 2^{\gamma_c \Delta EV}$$

Accordingly, representing the deviation for ISO 200 by $\Delta EV_{200}$, we have $$\Delta EV_{200} = 1 + \frac{\log (\alpha + 1)}{\log \alpha} \quad (12)$$

Smilarly, for ISO 800, we have $$\left.\begin{array}{l} R_T = \alpha^4 R_{02} \\ R_E = \frac{\alpha}{\alpha^3 + 1} R_{02} \end{array}\right\} \quad (13)$$

Combining the equations (13) and (10), the deviation $\Delta EV_{800}$ for ISO 800 is given as follows:

$$\Delta EV_{800} = 1 + \frac{\log (\alpha^3 + 1)}{\log \alpha} \quad (14)$$

Rewriting $\alpha = 2^{-\gamma_c}$ in the equations (12) and (14) yields:

$$\Delta EV_{200} = 1 - \frac{\log (2^{-\gamma_c} + 1)}{\gamma_c \log 2} \quad (15)$$

$$\Delta EV_{800} = 1 - \frac{\log (2^{-3\gamma_c} + 1)}{\gamma_c \log 2} \quad (16)$$

The deviation $\Delta EV_{200}$ and $\Delta EV_{800}$ are related to $\alpha$ and $\gamma_c$ (photoelectric conversion coefficient) as indicated in Table 1 below:

TABLE 1

| $\alpha$ | $\gamma_c$ | ΔEV ISO 200 | ΔEV ISO 800 | ΔEV ISO 1600 | ΔEV ISO 3200 |
|---|---|---|---|---|---|
| 0 | ∞ | 1.00 (EV) | 1.00 (EV) | 3.00 (EV) | 3.00 (EV) |
| 0.1 | 3.32 | 0.96 | 1.00 | 2.96 | 3.00 |
| 0.2 | 2.32 | 0.89 | 1.00 | 2.89 | 2.97 |
| 0.3 | 1.74 | 0.78 | 0.98 | 2.78 | 2.91 |
| 0.4 | 1.32 | 0.63 | 0.93 | 2.63 | 2.78 |
| 0.5 | 1.00 | 0.42 | 0.83 | 2.42 | 2.54 |
| 0.6 | 0.74 | 0.08 | 0.62 | 2.08 | 2.11 |
| 0.618 | 0.694 | 0.00 | 0.56 | 2.00 | 2.00 |
| 0.676 | 0.565 | −0.32 | 0.32 | 1.68 | 1.55 |
| 0.7 | 0.514 | −0.49 | 0.17 | 1.51 | 1.30 |
| 0.724 | 0.466 | −0.69 | 0.00 | 1.31 | 1.00 |
| 0.755 | 0.405 | −1.00 | −0.27 | 1.00 | 0.54 |
| 0.8 | 0.32 | −1.63 | −0.85 | 0.37 | −0.43 |
| 0.809 | 0.306 | −1.80 | −1.00 | 0.20 | −0.69 |
| 0.9 | 0.15 | −5.09 | −4.20 | −3.09 | −5.84 |
| 1.0 | 0 | −∞ | −∞ | −∞ | −∞ |

Figure 6:
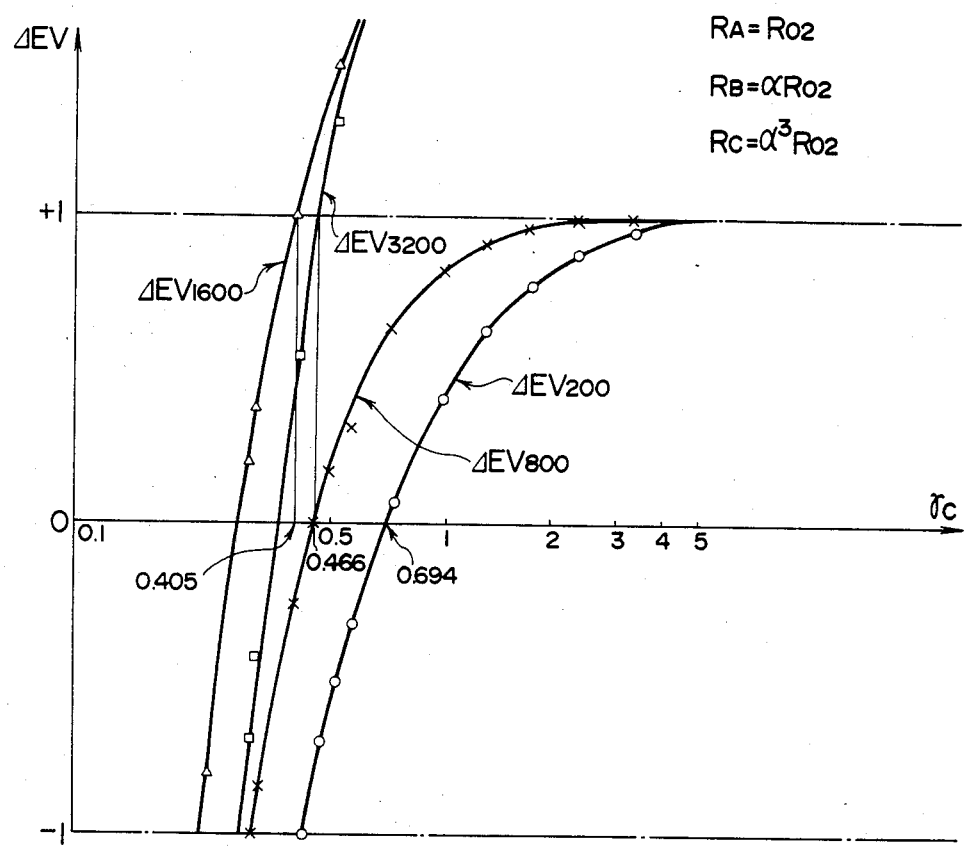
FIG. 6 graphically illustrates deviations $\Delta EV$ from proper exposure values corresponding to the photoelectric conversion coefficient $\gamma_c$ at various values of film speed when the automatic presetting resistors shown in the device of FIG. 5 have resistances which are chosen in the ratio of $1:\alpha:\alpha^3$.

The relationship between the deviations $\Delta EV_{200}$ and $\Delta EV_{800}$ given by the equations (15) and (16) and the photoelectric conversion coefficient $\gamma_c$ is graphically illustrated in FIG. 6. It will be apparent from the Table 1 and FIG. 6 that the magnitude of the deviation ΔEV from a proper exposure value can be kept within a permissible range for film speeds of ISO 200 and 800, by a suitable choice of the photoelectric conversion coefficient $\gamma_c$.

By way of example, when a choice is made that $\gamma_c = 0.565$, it follows that $\Delta EV_{200} = -0.32$ EV and $\Delta EV_{800} = +0.32$ EV. In other words, the absolute value of both deviations can be made equal to each other. It can be shown that for $0.466 \leq \gamma_c \leq 0.694$, we have $-0.69$ EV$\leq \Delta EV_{200} \leq 0$ and $0 \leq \Delta EV_{800} \leq 0.56$ EV, and this means that the magnitude of the deviations for ISO 200 and 800 can be kept within $\frac{2}{3}$ EV. If the deviation $\Delta EV$ for ISO 200 and 800 is allowed in a range given by the inequality $-1$ EV$\leq \Delta EV \leq 1$ EV, the photoelectric conversion coefficient $\gamma_c$ can be freely chosen in a range $0.405 \leq \gamma_c \leq \infty$.

Thus in the exposure control device shown in FIG. 5, the resistances $R_A$ to $R_C$ of the automatic presetting resistors 109 to 111 are chosen in the ratio of $1:2^{-\gamma_c}:2^{-3\gamma_c}$ and a suitable value for the photoelectric conversion coefficient $\gamma_c$ is chosen, thereby allowing the decision voltage $V_E$ to be kept within a desired range of exposure errors.

In the above description, an accommodation for film speeds from ISO 50 to 800 has been assumed, but an accommodation for film speeds of ISO 1600 and 3200 is also possible. The theoretical value $R_T$ of the automatic presetting resistors for ISO 1600 and 3200 are given as follows:

$$\left. \begin{array}{l} \text{ISO 1600; } R_T = R_{02} 2^{-5\gamma_c} = \alpha^5 R_{02} \\ \text{ISO 3200; } R_T = R_{02} 2^{-6\gamma_c} = \alpha^6 R_{02} \end{array} \right\} \quad (17)$$

On the other hand, the actual values $R_E$ are given as follows:

$$\left. \begin{array}{l} \text{ISO 1600;} \\ R_E = \dfrac{R_B \cdot R_C}{R_B + R_C} = \dfrac{\alpha}{\alpha^2 + 1} R_{02} \\ \text{ISO 3200;} \\ R_E = \dfrac{R_A \cdot R_B \cdot R_C}{R_A \cdot R_B + R_B \cdot R_C + R_C \cdot R_A} = \dfrac{\alpha}{\alpha + 1} R_{02} \end{array} \right\} \quad (18)$$

Combining the equations (10), (17) and (18), the deviations $\Delta EV_{1600}$ and $\Delta EV_{3200}$ for ISO 1600 and 3200 can be given as follows:

$$\Delta EV_{1600} = 2 + \frac{\log(\alpha^2 + 1)}{\log \alpha} = 2 - \frac{\log(2^{-2\gamma_c} + 1)}{\gamma_c \log 2} \quad (19)$$

$$\Delta EV_{3200} = 2 + \frac{\log(\alpha + 1)}{\log \alpha} = 2 - \frac{\log(2^{-\gamma_c} + 1)}{\gamma_c \log 2} \quad (20)$$

The relationship between the deviations $\Delta EV_{1600}$ and $\Delta EV_{3200}$ on one hand and the $\alpha$ and $\gamma_c$ on the other hand is indicated in the Table 1 given above, and these deviations are related to the photoelectric conversion coefficient $\gamma_c$ as graphically shown in FIG. 6. Accordingly, it will be seen from the Table 1 and FIG. 6 that the latitude for the choice of $\gamma_c$ will be substantially limited if it is desired to keep the deviation $\Delta EV$ for film speeds of ISO 200, 800, 1600 and 3200 within $+1$ EV. For example, when a choice is made that $\gamma_c = 0.405$, it follows that $\Delta EV_{200} = -1.00$ EV, $\Delta EV_{800} = 0.27$ EV, $\Delta EV_{1600} = 1.00$ EV and $\Delta EV_{3200} = 0.54$ EV, barely satisfying the desired limitation. Hence, if an exposure error within $\pm 1$ EV is permitted, a light receiving element having $\gamma_c = 0.405$ may be used to achieve an automatic accommodation for film speeds in a range from ISO 50 to 3200.

To achieve a theoretical resistance for ISO 50, 100, 400, the resistances of the automatic presetting resistors 109 to 111 used in the electrical circuit of FIG. 5 have been chosen in the ratio of $1:\alpha:\alpha^3$, or $R_A = R_{02}$, $R_B = \alpha R_{02}$ and $R_C = \alpha^3 R_{02}$. However, a theoretical resistance for other ISO values may be chosen. For example, if it is desired to establish theoretical resistances for ISO 100, 400 and 800, it is seen from the equations (8) that $$\left. \begin{array}{l} \text{ISO 100; } R_B = \alpha R_{02} \\ \text{ISO 400; } R_C = \alpha^3 R_{02} \\ \text{ISO 800; } \dfrac{R_C R_C}{R_C + R_A} = \alpha^4 R_{02} \end{array} \right\} \quad (21)$$

In this instance, we have $$\text{ISO 50; } R_A = \frac{\alpha^4}{1 - \alpha} R_{02}$$

Accordingly, theoretical resistances for film speeds of ISO 100, 400 and 800 can be established by choosing the resistances $R_A$ to $R_C$ in the ratio of $R_A:R_B:R_C = \alpha^4/(1-\alpha):\alpha:\alpha^3$, thus reducing the deviation $\alpha EV$ to zero for these film speeds. In this instance, the deviation for other film speeds, namely, $\alpha EV_{50}$, $\alpha EV_{200}$, $\alpha EV_{1600}$ and $\alpha EV_{3200}$ for ISO 50, 200, 1600 and 3200 are given as follows:

$$\left. \begin{array}{l} \Delta EV_{50} = -4 + \dfrac{\log(1-\alpha)}{\log \alpha} \\ \phantom{\Delta EV_{50}} = -4 - \dfrac{\log(1-2^{-\gamma_c})}{\gamma_c \log 2} \\ \Delta EV_{200} = 2 - \dfrac{\log(\alpha^3 - \alpha + 1)}{\log \alpha} \\ \phantom{\Delta EV_{200}} = 2 + \dfrac{\log(2^{-3\gamma_c} - 2^{-\gamma_c} + 1)}{\gamma_c \log 2} \\ \Delta EV_{1600} = 2 + \dfrac{\log(\alpha^2 + 1)}{\log \alpha} \\ \phantom{\Delta EV_{1600}} = 2 - \dfrac{\log(2^{-2\gamma_c} + 1)}{\gamma_c \log 2} \\ \Delta EV_{3200} = 2 + \dfrac{\log(\alpha + 1)}{\log \alpha} \\ \phantom{\Delta EV_{3200}} = 2 - \dfrac{\log(2^{-\gamma_c} + 1)}{\gamma_c \log 2} \end{array} \right\} \quad (22)$$

Figure 7:
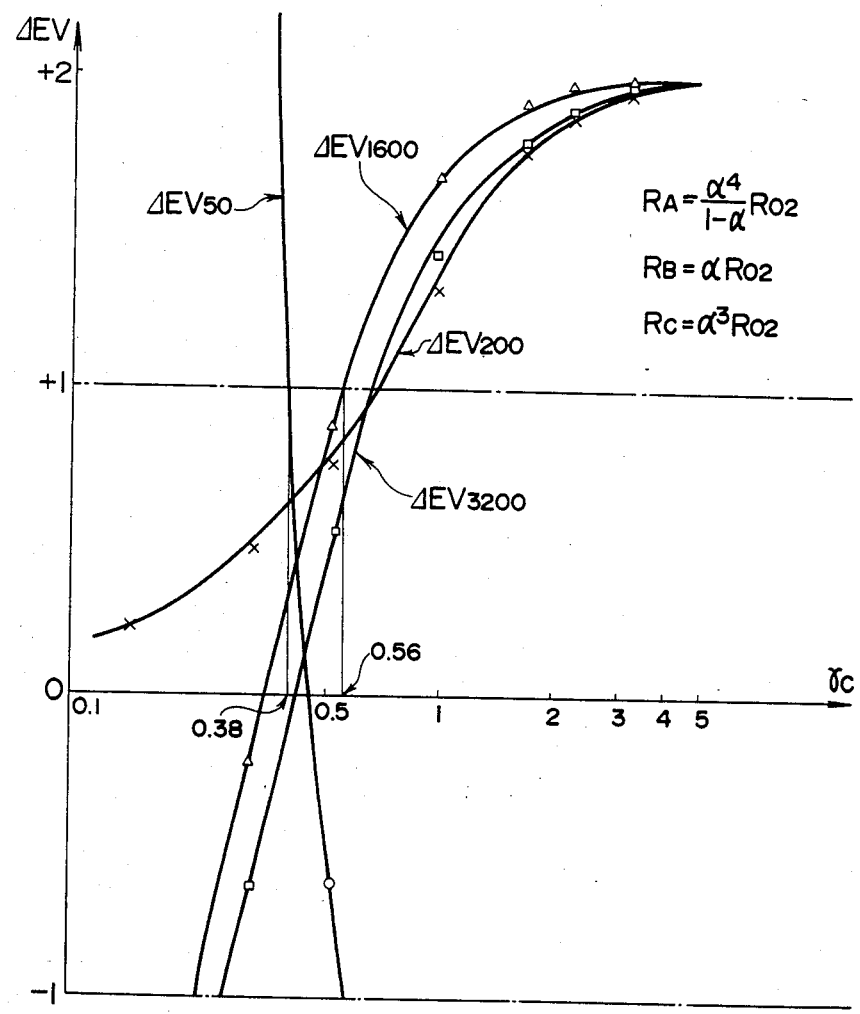
FIG. 7 graphically shows the deviations $\Delta EV$, in a manner similar to that shown in FIG. 6, when the automatic presetting resistors used in the device of FIG. 5 have resistances which are chosen in the ratio of $\alpha^4/(1-\alpha):\alpha:\alpha^3$.

The deviation $\alpha EV$ indicated by the equations (22) are graphically related to the photoelectric conversion coefficient $\gamma_c$ as shown in FIG. 7. It will be evident from the illustration of FIG. 7 that a choice of the photoelectric conversion coefficient $\gamma_c$ in a range from 0.38 to 0.56 permits the deviations for ISO 50, 200, 1600 and 3200 to be kept within $\pm 1$ EV. This represents a greater latitude for the choice of $\gamma_c$ in contrast to the choice of the ratio $1:\alpha:\alpha^3$ where the deviation $\Delta EV$ can barely be kept within $\pm 1$ EV only when a choice is made that $\gamma_c = 0.405$. A particular value of $\gamma_c$ can be chosen to minimize the resulting exposure error.

Figure 8:
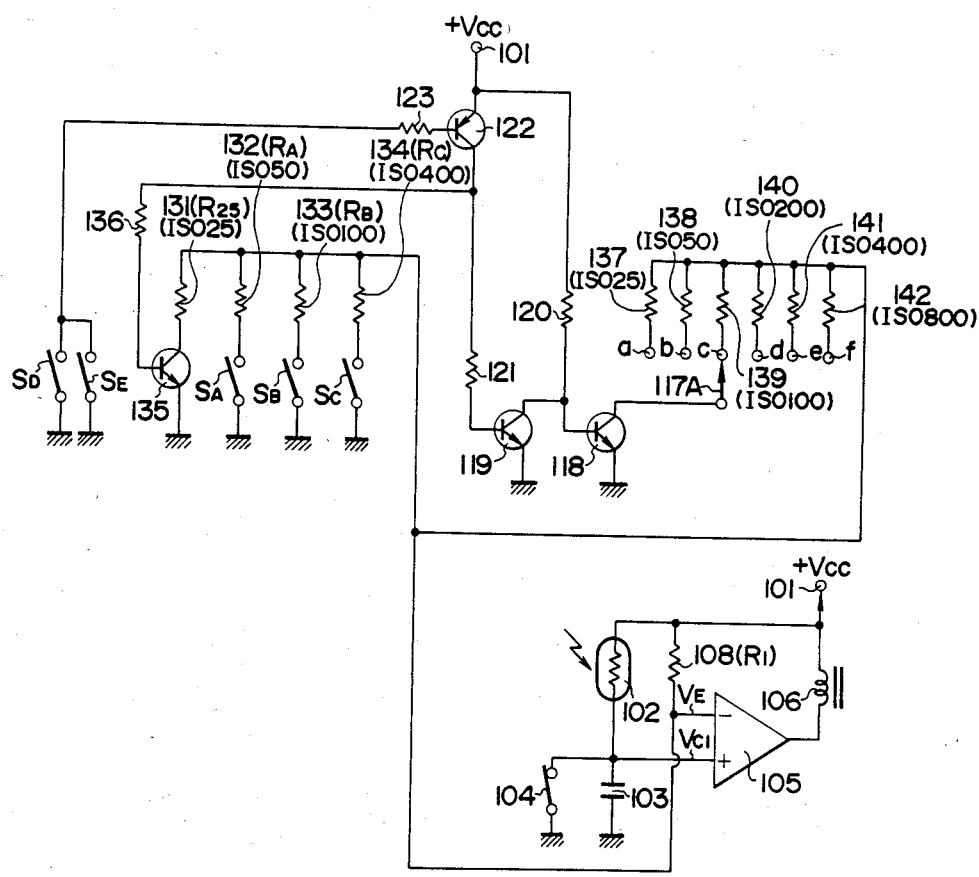
FIG. 8 is a circuit diagram of an exposure control device according to another embodiment of the invention.

FIG. 8 is a circuit diagram of an exposure control device according to another embodiment of the invention which permits film speed information from ISO 25 to 800 which can be read at an interval of 1 EV. The electrical circuit shown in FIG. 8 is generally similar to that shown in FIG. 5 except that automatic presetting resistors 131 to 134 have their one end connected to the inverting input of the comparator 105, to which the voltage divider resistor 108 is connected. The other end of each of the resistors 132 to 134 is connected to the ground through the read contacts $S_A$ to $S_C$, respectively, while the other end of the resistor 131 is connected to the collector of an NPN transistor 135. The automatic presetting resistors 131 to 134 have resistances $R_{25}$, $R_A$, $R_B$ and $R_C$ which are chosen as will be described later. The transistor 135 has its emitter connected to the ground and its base connected through a resistor 136 to the collector of the transistor 122. It is to be understood that the manual presetting resistors 137 to 142 are chosen so as to correspond to those values of film speed within a range from ISO 25 to 800 which vary at an interval of 1 EV. These resistors have their one end connected to the inverting input of the comparator 105 and their other end connected to each fixed contact a to f of a changeover switch 117A.

In the device shown in FIG. 8, when a film cartridge carrying no binary code is loaded into a camera, all of the read contacts $S_A$ to $S_E$ remain off, and hence the transistors 122, 119 and 135 are off while the transistor 118 is turned on, thus allowing one of the resistors 137 to 142 which is selected by the changeover switch 117A to be connected between the inverting input of the comparator 105 and the ground. Accordingly, a decision voltage $V_E$ as determined in accordance with the equations (6) and (8) is applied to the inverting input of the comparator 105. It is to be noted that the resistor 137 for ISO 25 has a resistance of $\alpha^{-1} R_{02}$.

When a film cartridge carrying a binary code is loaded into a camera, the read contacts $S_A$ to $S_E$ are selectively turned on and off in accordance with the binary code. Since at least one of the contacts $S_D$ and $S_E$ is turned on as mentioned previously, the transistors 122 and 119 are turned on while the transistor 118 is turned off to disable the manual presetting circuit. As the transistor 122 is turned on, the transistor 135 is turned on, whereby the resistor 131 is connected between the inverting input of the comparator 105 and the ground. Thus, the resistor 131 is connected to the comparator 105 whenever a film cartridge carrying a binary code is loaded into a camera. When the film speed indicated on the surface of the film cartridge is ISO 25, all of the read contacts $S_A$ to $S_C$ are off, and hence only the resistor 131 will be connected to the comparator 105.

As will be appreciated, the resistance $R_2$ for each film speed of ISO 50, 100, 400 and 800 should theoretically be as follows:

$$\left. \begin{array}{l} \text{ISO 50;} \ R_2 = \dfrac{R_{25} \cdot R_A}{R_{25} + R_A} = R_{02} \\[6pt] \text{ISO 100;} \ R_2 = \dfrac{R_{25} \cdot R_B}{R_{25} + R_B} = \alpha R_{02} \\[6pt] \text{ISO 400;} \ R_2 = \dfrac{R_{25} \cdot R_C}{R_{25} + R_C} = \alpha^3 R_{02} \\[6pt] \text{ISO 800;} \ R_2 = \dfrac{R_{25} \cdot R_A \cdot R_C}{R_{25} \cdot R_A + R_A \cdot R_C + R_C \cdot R_{25}} \\[6pt] \qquad\qquad = \alpha^4 R_{02} \end{array} \right\} \quad (23)$$

Solving the equations (23) for the resistances $R_{25}$, $R_A$, $R_B$ and $R_C$, we have:

$$\left. \begin{array}{l} R_{25} = \dfrac{\alpha^4}{\alpha^4 + \alpha - 1} R_{02} \\[6pt] \qquad = \dfrac{2^{-4\gamma_c}}{2^{-4\gamma_c} + 2^{-\gamma_c} - 1} R_{02} \\[6pt] R_A = \dfrac{\alpha^4}{1 - \alpha} R_{02} = \dfrac{2^{-4\gamma_c}}{1 - 2^{-\gamma_c}} R_{02} \\[6pt] R_B = \dfrac{\alpha^4}{1 - \alpha + \alpha^3 - \alpha^4} R_{02} \\[6pt] \qquad = \dfrac{2^{-4\gamma_c}}{1 - 2^{-\gamma_c} + 2^{-3\gamma_c} - 2^{-4\gamma_c}} R_{02} \\[6pt] R_C = \dfrac{\alpha^4}{1 - \alpha^4} R_{02} = \dfrac{2^{-4\gamma_c}}{1 - 2^{-4\gamma_c}} R_{02} \end{array} \right\} \quad (24)$$

Thus, when the resistances $R_{25}$, $R_A$, $R_B$ and $R_C$ of the automatic presetting resistors 131 to 134 are chosen in accordance with the equations (24), theoretical resistances are established for film speeds of ISO 50, 100, 400 and 800. Accordingly, the deviation $\Delta EV$ is equal to zero in this instance.

In this instance, the resistance for film speed of ISO 25 and 200 will deviate from theoretical values. The theoretical resistance of the automatic presetting resistor for ISO 25 and 100 is given as follows:

$$\left. \begin{array}{l} \text{ISO 25;} \ R_T = \alpha^{-1} R_{02} \\ \text{ISO 200;} \ R_T = \alpha^2 R_{02} \end{array} \right\} \quad (25)$$

On the other hand, the actual value will be as follows:

$$\left. \begin{array}{l} \text{ISO 25;} \ R_E = R_{25} = \dfrac{\alpha^4}{\alpha^4 + \alpha - 1} R_{02} \\[6pt] \text{ISO 200;} \ R_E = \dfrac{R_{25} \cdot R_A \cdot R_B}{R_{25} \cdot R_A + R_A \cdot R_B + R_B \cdot R_{25}} \\[6pt] \qquad = \dfrac{\alpha^4}{\alpha^3 - \alpha + 1} R_{02} \end{array} \right\} \quad (26)$$

Combining the equations (25) and (26) with the equation (10), the deviations $\Delta EV_{25}$ and $\Delta EV_{200}$ for ISO 25 and 200 are obtained as follows:

$$\left. \begin{array}{l} \Delta EV_{25} = -5 + \dfrac{\log (\alpha^4 + \alpha - 1)}{\log \alpha} \\[6pt] \qquad = -5 - \dfrac{\log (2^{-4\gamma_c} + 2^{-\gamma_c} - 1)}{\gamma_c \log 2} \\[6pt] \Delta EV_{200} = -2 + \dfrac{\log (\alpha^3 - \alpha + 1)}{\log \alpha} \\[6pt] \qquad = -2 - \dfrac{\log (2^{-3\gamma_c} - 2^{-\gamma_c} + 1)}{\gamma_c \log 2} \end{array} \right\} \quad (27)$$

It will be seen that by choosing a value for the photoelectric conversion coefficient $\gamma_c$ which enables the deviations $\Delta EV_{25}$ and $\Delta EV_{200}$ to be kept within a permissible range of exposure errors, an automatic accommodation for a range of film speeds from ISO 25 to 800 is achieved at an interval of 1 EV.

It is to be understood that an automatic accommodation for film speeds of ISO 1600 and 3200 can also be achieved in the device described above. Specifically, when the resistances $R_{25}$, $R_A$, $R_B$ and $R_C$ of the resistors 131 to 134 are chosen in accordance with the equations (24), the theoretical value $R_T$ and the actual value $R_E$ for ISO 1600 and 3200 will be as follows:

$$\text{ISO 1600; } R_T = \alpha^5 R_{02} \atop \text{ISO 3200; } R_T = \alpha^6 R_{02} \Biggr\} \quad (28)$$

$$\text{ISO 1600; } R_E = \frac{R_{25} \cdot R_B \cdot R_C}{R_{25} \cdot R_B + R_B \cdot R_C + R_C \cdot R_{25}}$$

$$= \frac{\alpha^4}{1 + \alpha^3 - \alpha^4} \qquad (29)$$

$$\text{ISO 3200; } R_E = \frac{R_{25} \cdot R_A \cdot R_B \cdot R_C}{R_A \cdot R_B \cdot R_C + R_B \cdot R_C \cdot R_{25} + R_C \cdot R_{25} \cdot R_B + R_{25} \cdot R_C \cdot R_B}$$

The resulting deviations $\Delta EV_{1600}$ and $\Delta EV_{3200}$ are given as follows:

$$\Delta EV_{1600} = 1 + \frac{\log(1 + \alpha^3 - \alpha^4)}{\log \alpha}$$

$$= 1 - \frac{\log(1 + 2^{-3\gamma_c} - 2^{-4\gamma_c})}{\gamma_c \log 2}$$

$$\Delta EV_{3200} = 2 + \frac{\log(2 - \alpha + \alpha^3 - \alpha^4)}{\log \alpha} \qquad (30)$$

$$= 2 - \frac{\log(2 - 2^{-\gamma_c} + 2^{-3\gamma_c} - 2^{-4\gamma_c})}{\gamma_c \log 2}$$

It will thus be seen that by choosing a value of the photoelectric conversion coefficient $\gamma_c$ so that the deviations $\Delta EV_{25}$, $\Delta EV_{200}$, $\Delta EV_{1600}$ and $\Delta EV_{3200}$ can be kept within a permissible range of exposure errors, the automatic accommodation for film speeds in a range from ISO 25 to 3200 can be achieved at an interval of 1 EV.

Figure 9:
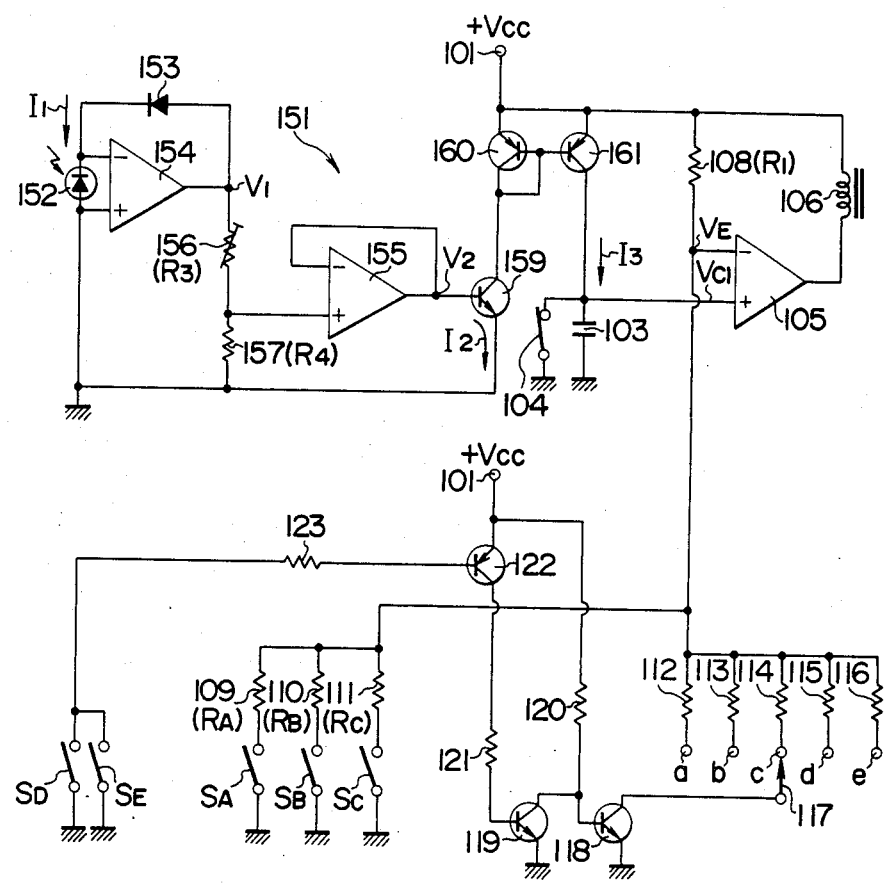
FIG. 9 is a circuit diagram of an exposure control device according to a further embodiment of the invention.

FIG. 9 is a circuit diagram of an exposure control device according to a further embodiment of the invention. In this embodiment, a light receiving element 152 comprises a silicon photodiode (SPD) which is used as a photoelectric transducer element. It will be noted that the electrical circuit shown in FIG. 9 is substantially similar to the electrical circuit shown in FIG. 5 except for a circuit portion associated with the light receiving element 102. It will be seen that the element 102 is replaced in this embodiment by a photometric circuit 151 which includes light receiving element 152, logarithmic compression diode 153, operational amplifiers 154, 155, resistors 156, 157 and transistors 159 to 161. Specifically, in the photometric circuit 151, the anode of the element 152 or silicon photodiode is connected to the non-inverting input of the operational amplifier 154 which is connected to the ground while its cathode is connected to the inverting input of the amplifier 154 and to the cathode of the logarithmic compression diode 153. The output terminal of the amplifier 154 is connected to the anode of the diode 153 and also connected to the ground through a series combination of voltage divider resistors 156, 157. The resistor 156 is formed by a semi-fixed resistor so that its resistance can be varied. The junction between the resistors 156 and 157 is connected to the non-inverting input of the amplifier 155, which has its inverting input connected to the output thereof, thereby forming an impedance converting buffer amplifier. The output of the amplifier 155 is connected to the base of an NPN transistor 159, which has its emitter connected to the ground and its collector connected to the bases of PNP transistors 160, 161 and to the collector of the transistor 160. The transistors 160 and 161 form a current mirror circuit, and their emitters are connected in common to the terminal 101, to which the supply voltage is applied. The collector of the transistor 161 is connected to the non-inverting input of the comparator 105, to which both the integrating capacitor 103 and the switch 104 are connected.

In operation, when a photocurrent $I_1$ flows through the element 152 in accordance with the amount of incident light, there is developed a voltage $V_1$ at the output of the amplifier 154 which represents a logarithmic compression of the photocurrent $I_1$. Specifically, a relationship is established as indicated below:

$$I_1 = I_S \left( \exp \frac{qV_1}{kT} - 1 \right) \qquad (31)$$

where Is represents a saturation current, k Boltzmann's constant ($8.62 \times 10^{-5}$ ev/°K.), q the charge of an electron ($1.6 \times 10^{-14}$ C.) and T the absolute temperature (°K.). At room temperature, the term "−1" appearing in the equation (31) can be omitted, and hence this equation can be solved for $V_1$ as follows:

$$V_1 = \frac{kT}{q} \ln \frac{I_1}{I_S} \qquad (32)$$

Representing the photocurrent which flows at a reference level of brightness by Is which is equal to the saturation current, a difference in the brightness level from a reference level by $\Delta EV_{(EV)}$ and the photoelectric conversion coefficient of the silicon photodiode by $\gamma_{SPD}$, we have:

$$I_1 = I_S \cdot 2^{\gamma_{SPD} \cdot \Delta EV} \qquad (33)$$

The substitution of the equation (33) into the equation (32) yields:

$$V_1 = \frac{kT}{q} \ln 2 \times \gamma_{SPD} \cdot \Delta EV \qquad (34)$$

Since the photoelectric conversion coefficient $\gamma_{SPD}$ of a silicon photodiode is usually equal to 1, the equation (34) can be rewritten as follows:

$$V_1 = \left( \frac{kT}{q} \ln 2 \right) \times \Delta EV \qquad (35)$$

This means that the output voltage $V_1$ from the amplifier 154 depends on the difference in the brightness level $\Delta EV$ from the reference level. The voltage $V_1$ is divided by a voltage divider formed by the resistors 156 and 157, and the divided voltage is applied to the amplifier 155. Representing the resistances of the resistors 156, 157 by $R_3$ and $R_4$, respectively, the output voltage $V_2$ from the amplifier 155 is expressed as follows:

$$V_2 = \frac{R_4}{R_3 + R_4} \times V_1 \qquad (36)$$

$$= \frac{R_4}{R_3 + R_4} \times \left(\frac{kT}{q} \ln 2\right) \times \Delta EV$$

Using an equality $R_4/(R_3+R_4)=\gamma_c$, the equation (36) can be rewritten as follows:

$$V_2 = \left(\frac{kT}{q} \ln 2\right) \times \gamma_c \times \Delta EV \qquad (37)$$

$$= \frac{kT}{q} \ln 2^{\gamma_c \Delta EV}$$

The current $I_2$ which passes across the base and the emitter of the transistor 159 is given as follows:

$$I_2 = Is\left(\exp\frac{qV_2}{kT} - 1\right) \approx Is\left(\exp\frac{qV_2}{kT}\right) \qquad (38)$$

From the equation (38), we have:

$$V_2 = \frac{kT}{q} \ln \frac{I_2}{Is} \qquad (39)$$

Combining the equations (37) and (39), we have:

$$I_2 = Is\, 2^{\gamma_c \Delta EV} \qquad (40)$$

It will be noted that the equation (40) is similar in form to the equation (33). In other words, the magnitude of the current $I_2$ is determined by the value of $\gamma_c$ which is in turn determined by the ratio of the resistances $R_3$ and $R_4$ of the resistors 156 and 157. Since the transistors 160, 161 form a current mirror circuit, a charging current $I_3$ to the integrating capacitor 103 has a magnitude which is proportional to the current $I_2$, or $$I_3 = h_{fe} \cdot I_2 \qquad (41)$$
$$= h_{fe} \cdot Is\, 2^{\gamma_c \Delta EV}$$

where $h_{fe}$ represents the current amplification factor of the transistor 159. It is seen that the charging current $I_3$ to the integrating capacitor 103 can be varied by changing the value of $\gamma_c$, which can be considered as the photoelectric conversion coefficient of the photometric circuit 151.

It will therefore be seen that an automatic accommodation for film speeds in a range from ISO 50 to 800 can be achieved at an interval of 1 EV when a silicon photodiode having the photoelectric conversion coefficient $\gamma_{SPD}=1$ is used in an exposure control device, by choosing the resistances $R_A$ to $R_C$ of the automatic presetting resistors 109 to 111 for film speeds of ISO 50, 100 and 400 in the ratio mentioned above ($1:\alpha:\alpha^3$), and adjusting the semi-fixed resistor 156 in the photometric circuit 151 to establish a suitable value for the photoelectric conversion coefficient $\gamma_c$ such that the deviations $\Delta EV$ in the amount of exposure form a theoretical value can be kept within a permissible range for film speeds of ISO 200 and 800 for which theoretical resistances cannot be employed.

What is claimed is:

1. An exposure control device for a camera comprising:
   at least three read contacts for reading film speed information indicated on a film cartridge in the form of a binary code comprising at least three digits;
   an adjustable reference voltage setting circuit including at least three automatic presetting resistors having their one end connected to a separate one of the at least three read contacts for developing at their other ends, which are connected in common, a reference voltage in accordance with the film speed information which causes the read contacts to be selectively turned on and off for use in the decision of an exposure level;
   a photometric circuit for generating an output signal which is a function of the photoelectric conversion coefficient $\gamma_c$ of the photometric circuit;
   a comparator having a first input to which said other end of the at least three resistors is connected in common and a second input to which the output of the photometric circuit is directly connected; and
   an exposure controlling member operative in response to an output signal from the comparator, the value of the photoelectric conversion coefficient $\gamma_c$ being chosen so that the reference voltage applied to the first input of the comparator for more than four different values of film speed which are spaced apart at least by 1 EV are kept with in a permissible range of exposure errors so that the magnitude of the exposure errors is minimized;
   at least three of the read contacts which are used to read the three most significant digits of the binary code being allocated to read typical film speeds, each of such contacts and an associated resistor being connected in series between the first input of the comparator and the ground, whereby when a plurality of read contacts are turned on, a composite resistance formed by a parallel combination of the resistors which are connected to those contacts which are turned on define a reference voltage applied to the first input in accordance with the particular value of film speed designated by the film cartridge.

2. An exposure control device according to claim 1 in which there are three automatic presetting resistors having resistances which are chosen in the ratio of $1:2^{-\gamma_c}:2^{-3\gamma_c}$.

3. An exposure control device according to claim 1 in which there are three automatic presetting resistors having resistances which are chosen in the ratio of $2^{-4\gamma_c}/(1-2^{-\gamma_c}):2^{-\gamma_c}:2^{-3\gamma_c}$.

4. An exposure control device according to claim 1 in which one of the at least three read contacts which is allocated to read a digit which is less significant than the three most significant digits of the binary code is adapted to detect that a film cartridge carrying a binary code is loaded into a camera, the device including a manual presetting circuit comprising a plurality of manual presetting resistors having their one end connected to the first input of the comparator, and a changeover switch for manually selecting one of the manual presetting resistors, the device also including an automatic selection circuit including said one contact and a switching circuit which enables or disables the manual presetting circuit when said one contact is turned on or off, respectively.

5. An exposure control device according to claim 4 in which the plurality of manual presetting resistors have resistances which are chosen to change from one to the next by a factor of $2^{-\gamma_c}$, for each change in film speed of 1 EV, as referenced to a selected resistance which corresponds to a particular film speed.

6. An exposure control device according to claim 1 in which the photometric circuit includes a light receiving element in the form of a photoelectric transducer element as may be formed by a cadmium sulfide (CdS) element, the transducer element determining the value of the photoelectric conversion coefficient $\gamma_c$.

7. An exposure control device according to claim 1 in which the photometric circuit includes a light receiving element in the form of a photoelectric transducer element as may be formed by a silicon photodiode, the output of the transducer element being connected to a voltage divider, the division ratio of which determines the photoelectric conversion coefficient $\gamma_c$.

8. An exposure control device according to claim 7 in which the voltage divider is adjustable to adjust the output of the photometric circuit applied to the comparator.

9. An exposure control device according to claim 7 in which the photometric circuit includes a charging capacitor which is charged at a rate determined by the silicon photodiode;
said voltage divider being comprised of series connected resistors receiving the current output of the silicon photodiode, the charging capacitor being coupled to the common terminal therebetween;
one of said series connected resistors being adjustable for adjusting the photoelectric conversion coefficient in order to maintain the aforesaid exposure errors within the aforementioned permissible range.

10. An exposure control device according to claim 1 in which the exposure controlling member comprises an electromagnet which controls the operation of a shutter.

11. An exposure control device according to claim 1 wherein the value of the coefficient $\gamma_c$ is selected so that the preferred range of error $\Delta EV$ is $-1 \ EV \leq \Delta EV \leq +1 \ EV$.

12. An exposure control device according to claim 11 wherein the preferred range of $\Delta EV$ is $-\frac{2}{3} \ EV \leq \Delta EV \leq +\frac{2}{3} \ EV$.

13. An exposure control device according to claim 1 in which the output of the photometric circuit is logarithmically compressed by logarithmic compression means before application to the comparator, while the output of said adjustable reference voltage setting circuit is directly applied to said comparator without undergoing logarithmic compression.

14. A logarithmic conversion circuit according to claim 1 further including a manually adjustable reference voltage setting circuit having a plurality of resistors each having one end connected in common to an output terminal coupled to the common connection of said adjustable reference voltage setting circuit;
electronic switch means;
manually operable switch means, for selectively coupling one of the resistors in said manually adjustable reference voltage setting circuit to said electronic switch means;
means responsive to the presence of a film cartridge having binary coded film speed information provided thereon for deactivating said electronic switch and for activating said electronic switch when the film cartridge has no binary coded film speed information provided thereon so as to selectively connect only one of said automatic and manual reference voltage setting circuits to said comparator.

15. An exposure control device according to claim 1 wherein said photometric conversion circuit further includes a photometry element;
means for logarithmically compressing the output of the photometry element;
voltage divider means for adjusting the logarithmically compressed photometric element signal; and means for coupling the adjusted output of the voltage divider means to said comparator, said voltage divider means being adjusted to adjust the photometric conversion coefficient of the photometric circuit.

16. An exposure control device according to claim 1 wherein the decision voltage levels generated by the voltage setting circuit are greater in number then the number of presetting resistors.

17. An exposure control device for a camera comprising:
at least three read contacts for reading film speed information indicated on a film cartridge in the form of a binary code comprising at least three digits;
a switching element which is turned on as a film cartridge carrying a binary code is loaded into the camera;
at least four automatic presetting resistors having their one end connected to the switching element and to that least three read contacts for developing at their other ends, which are connected in common, a reference voltage in accordance with a film speed read from the film cartridge which causes the contacts to be selectively turned on and off, for use in the decision of an exposure level;
a photometric circuit for generating an output signal which is a function of the photoelectric conversion coefficient $\gamma_c$ of the photometric circuit;
a comparator having a first input to which the other end of the at least four resistors is connected and a second input to which the output of the photometric circuit is connected;
an exposure controlling member operative in response to an output signal from the comparator, the value of the photoelectric conversion coefficient $\gamma_c$ being chosen so that each of the reference voltages applied to the first input of the comparator for five or more values of film speed which are separated apart by at least 1 EV be kept within a permissible range of exposure errors so that the magnitude of the exposure errors is minimized; and
at least three of the read contacts which are associated with the three most significant digits of the binary code are allocated to read typical film speeds (ISO 50, 100 and 400), each of the switching elements and the read contacts being connected in series with an associated automatic presetting resistor between the first input of the comparator and the ground so that when a plurality of read contacts are turned on, a composite resistance formed by a parallel combination of automatic presetting resistors which are connected to the switching element and those read contacts which are turned on establishes a reference voltage applied to the first input in accordance with the particular value of film speed.

18. An exposure control device according to claim 17 in which the switching element is formed by a transistor which is turned on in response to the closure of a contact which is allocated to detect the loading of a film cartridge carrying a binary code.

19. An exposure control device according to claim 10 in which the automatic presetting resistors connected to the switching element and the read contacts have resistances which are chosen in the ratio of $$\frac{2^{-4\gamma c}}{2^{-4\gamma c} + 2^{-\gamma c} - 1} : \frac{2^{-4\gamma c}}{1 - 2^{-\gamma c}} :$$

$$\frac{2^{-4\gamma c}}{1 - 2^{-\gamma c} - 2^{-3\gamma c} - 2^{-4\gamma c}} : \frac{2^{-4\gamma c}}{1 - 2^{-4\gamma c}}$$

* * * * *

UNITED STATES PATENT AND TRADEMARK OFFICE
CERTIFICATE OF CORRECTION

PATENT NO. : 4,598,985

DATED : July 8, 1986

INVENTOR(S) : Akira Inoue

It is certified that error appears in the above-identified patent and that said Letters Patent is hereby corrected as shown below:

IN THE SPECIFICATION

Column 5, line 67, change "$a^4/(-$" to --$a^4/(-$--.

Signed and Sealed this

Twenty-sixth Day of January, 1988

Attest:

DONALD J. QUIGG

Attesting Officer   Commissioner of Patents and Trademarks